United States Patent

Hull et al.

[11] Patent Number: 5,350,184
[45] Date of Patent: Sep. 27, 1994

[54] BICYCLE TOW-BAR FOR WHEELCHAIRS

[76] Inventors: Harold L. Hull, 401 Canyon Way #43, Sparks, Nev. 89434; Ronald D. Loftis; Carolyn I. Loftis, both of 20595 Eaton Rd., Reno, Nev. 89511

[21] Appl. No.: 992,806

[22] Filed: Dec. 18, 1992

[51] Int. Cl.$^5$ .................................... B62K 27/00
[52] U.S. Cl. .................................. 280/204; 280/292; 280/480
[58] Field of Search ............... 280/292, 480, 204, 657, 280/202, 460.1

[56] References Cited

U.S. PATENT DOCUMENTS

| | | | |
|---|---|---|---|
| 1,954,179 | 4/1934 | Krug | 280/204 |
| 3,829,125 | 8/1974 | Davis | 280/204 |
| 4,381,117 | 4/1983 | French | 280/204 |
| 4,437,599 | 3/1984 | Jordening | 224/319 |
| 4,695,071 | 9/1987 | Johnston | 280/204 |
| 4,725,067 | 2/1988 | Lundy | 280/292 X |
| 4,854,269 | 8/1989 | Arntzen | 119/29 |
| 4,890,852 | 1/1990 | Chapman | 280/402 |
| 5,020,813 | 6/1991 | Gottschalk | 280/204 |
| 5,020,814 | 6/1991 | George | 280/204 |
| 5,028,059 | 7/1991 | Baker | 280/20 |
| 5,039,120 | 8/1991 | Stowe | 280/292 X |
| 5,067,738 | 11/1991 | O'Connor | 280/204 |
| 5,076,599 | 12/1991 | Lockett | 280/204 |
| 5,076,600 | 12/1991 | Fake | 280/204 |

*Primary Examiner*—Karin L. Tyson
*Assistant Examiner*—C. Mattix

[57] ABSTRACT

Disclosed is a bicycle tow-bar which is adapted to be attached between a bicycle and a wheelchair with the attachment to the wheelchair being versatile enough to capture the front swivel wheels of most wheelchairs and easily attached and un-attached to a bicycle by a ball-hitch attached to the seat post. A mud-guard is also disclosed which is easily attached to the tow-bar to repel mud or small rocks, etc.

2 Claims, 2 Drawing Sheets

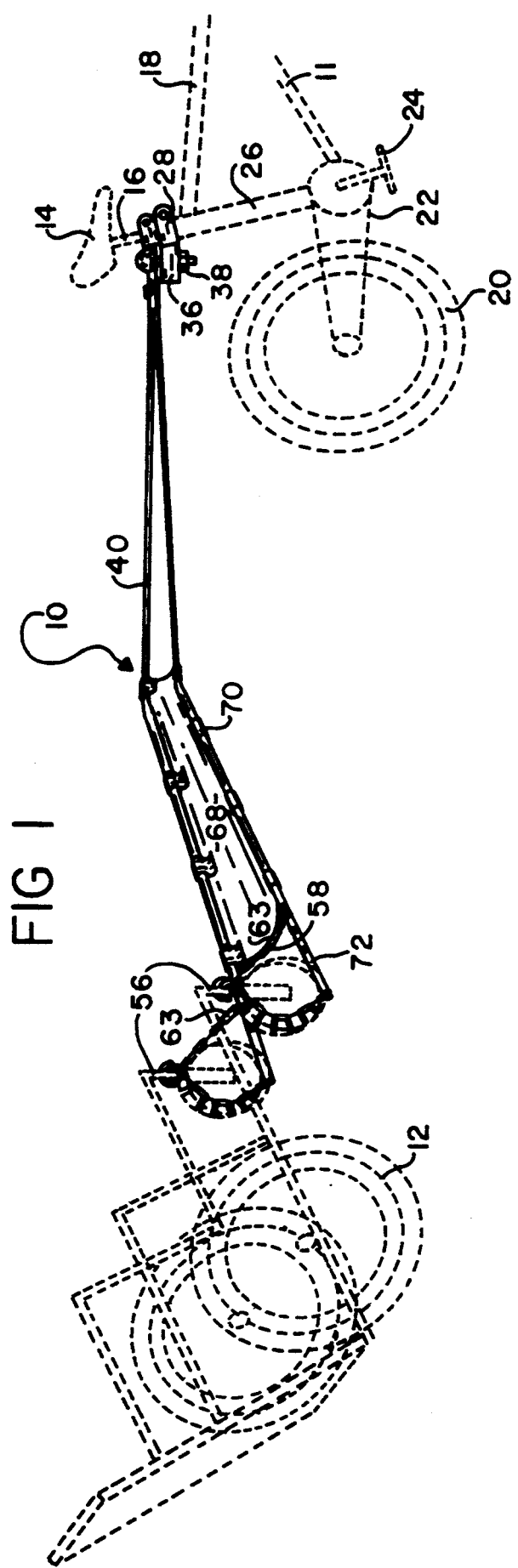
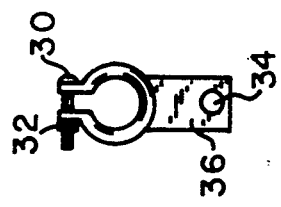
FIG 1
FIG 2

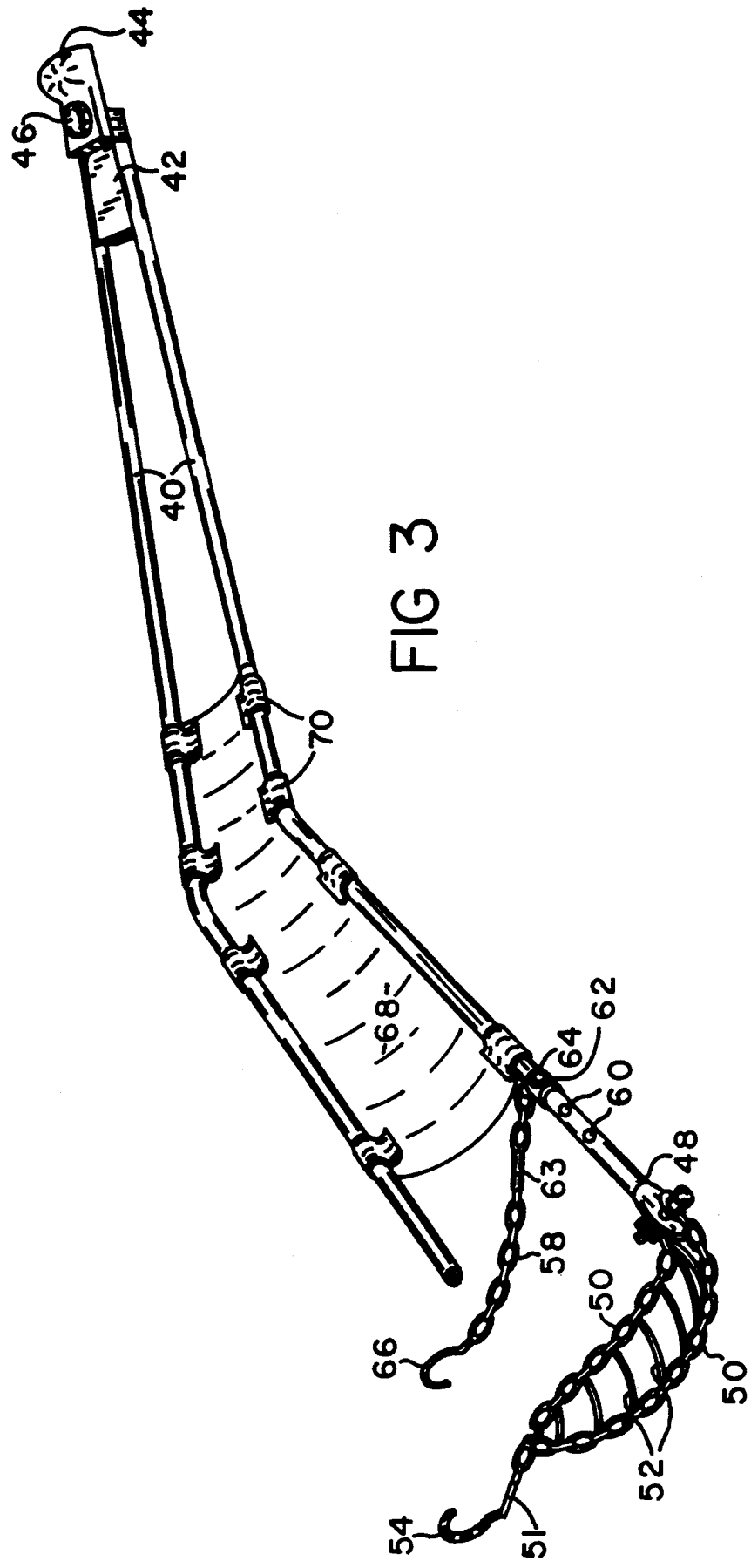

BICYCLE TOW-BAR FOR WHEELCHAIRS

FIELD OF THE INVENTION

This invention relates to bicycles and more particularly to a bicycle tow-bar associated with a second wheeled vehicle such as a wheelchair or the like.

BACKGROUND OF THE INVENTION

It is well documented in prior art to provide wheeled vehicles which may be attached to a bicycle such as U.S. Pat. No. 5,020,814, which is a collapsible bicycle trailer requiring its own wheels and tow-bar or the child powered bicycle trailer of U.S. Pat. No. 5,067,738, which teaches an additional wheel with its own pedaling system or the U.S. Pat. No. 5,076,599, which teaches a convertible stroller and trailer combination which again requires its own wheels and tow-bar.

While bicycle trailers are not new in themselves the trailers disclosed in the exemplary patents above, none of them teach a tow-bar apparatus which may be attached to a prior art wheeled vehicle such as a wheelchair which utilizes the present structure and wheels of the existing wheeled vehicle.

For disabled persons it is desirable to provide a tow-bar which is attachable to their own wheelchair and which may be attached at its distal end to a bicycle. This eliminates the expense of a specialized trailer and the inconvenience of transferring the disabled person from their own wheelchair to a specialized trailer.

The exhilarating and uplifting experience of being able to take a "bicycle ride" with their friends, family and/or associates cannot be over emphasized especially from the comfort of their own wheelchair.

SUMMARY OF THE INVENTION

It is therefore a primary object to provide a versatile tow-bar which is adaptable to most wheelchairs and most bicycles.

It is another object to provide a tow-bar which lifts the front swivel wheels of the wheelchair off of the ground thus allowing the rugged structure of the main pair of support wheels to act and perform as a two wheel trailer.

It is yet another object to provide on the ends of the tow-bar associated with the wheelchair, connecting means which will allow the tow-bar to be used with substantially all wheelchairs.

Still another important object is to provide on the end of the tow-bar associated with the bicycle a simple hitch which is easily attached or detached and which may be used with substantially all bicycles.

Another important object is to provide the bicycle hitch which in its preferred embodiment, allows the wheelchair to move in three dimensions or planes in relation to the bicycle.

Yet another important object is to provide in association with the tow-bar a mud-guard to deflect mud or small rocks from reaching the occupant of the wheelchair.

Another object is to use the end of a tow-bar, which is attached to the wheelchair, as a skid-plate.

Other objects and advantages will become apparent when taken into consideration with the following specifications and drawings.

BRIEF DESCRIPTION OF THE DRAWINGS

FIG. 1, is a partial perspective view of the tow-bar when attached to a bicycle and wheelchair.

FIG. 2, is a mounting top view of a mounting bracket.

FIG. 3, is a perspective view of the tow-bar unattached.

DETAILED DESCRIPTION OF THE DRAWINGS

Referring now to the drawings in detail wherein like characters refer to like elements throughout the various drawings, 10 is an overview of the tow-bar of the present invention attached to a ghost bicycle 11, and ghost wheelchair 12 with bicycle seat 14, and seat support 16, and cross bar 18 with 20 being the back wheel with sprocket chain 22 and pedal 24, while 26 is a support for seat support 16 and 28 is a mounting bracket (more clearly shown in FIG. 2), which may be held in place and tightened by bolt 30 and nut 32. 34 is a mounting hole for a hitch knob (not shown) secured to plate 36 by nut 38, (shown in FIG. 1).

The main tow-bar frame 40, which may be fabricated from metal tubing, is suitably secured together at the bicycle end by hitch plate 42 by means such as welding (not shown), with hitch plate 42 also acting as a support for ball-hitch 44 and tightening means 46, while on the wheelchair ends 48 (only one end shown), are attached tire-chains 50 and turnbuckle 51 for fastening cross link cables 52 suitably attached to tire-chains 50. Tire-chains 50 have hooks 54 which may be hooked around upright wheel support 56 in FIG. 1, or around the upright support 56 and then hooked into one of its own links for adjustment. 58 is also a chair selectively affixed to the tow-bar 40 thru multiple holes 60 by clamp member 62 and bolt and nut 64, with 63 being a turnbuckle for tightening its hook 66, also, being hooked around upright wheel support 56 or around the upright support 56 and then hooked into one of its own links for adjustment.

68 is a mud-guard made of a suitable material such as canvas and suitably affixed to the tow-bar 40 by suitable means such as VELCRO TM attach loops 70.

It will also be noted that the wheelchair ends of the tow-bar act as a skid-plate as shown in FIG. 1, at 72.

It will now be seen that we have provided a tow-bar which is versatile, economical to build (as no special tooling is required) and which may be attached to any bicycle having a seat post and to any wheelchair having a pair of front swivel wheels.

It will also be seen that we have provided a tow-bar that lifts the pair of front swivel wheels clear of the ground and acts as a skid-plate.

We have also provided a simple mud-guard to deflect small gravel or mud from reaching the wheelchair occupant.

Also, by using a ball-type hitch the tow-bar may be easily installed or removed much as a regular trailer, and allows the wheelchair to be supported on its back wheels only, thus acting as a trailer with freedom to move in three dimensions or planes.

Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

Having described our invention, what we claim as new and desire to secure by Letters Patent is:

1. A bicycle tow-bar in combination with a towing bicycle and a towed wheelchair, said bicycle having a frame, a seat post with a seat thereon, a tow-bar mounting means secured rearwardly from said seat post, said wheelchair having at least a pair of front swivel wheels and at least a pair of rear support wheels, said bicycle tow-bar comprising; left and right elongated bars having first and second ends, said elongated bars being fixedly attached at their said first ends, said first ends having pivotable attaching means to attach to said tow-bar mounting means of said bicycle, said second ends of said elongated bars being un-attached to each other and spaced apart forming said elongated bars in the shape of a flexible inverted V, means to removably and separately attach said second ends of said elongated bars to said pair of said front swivel wheels of said wheelchair by chains, said chains surrounding and capturing said front swivel wheels in a fixed relationship, said chains having tensioning means whereby;

when said tow-bar is affixed to said bicycle and said wheelchair, said pair of said front swivel wheels of said wheelchair are raised out of communication with a supporting surface while said rear support wheels communicate with said supporting surface to become a two-wheel trailer.

2. The bicycle tow-bar in combination with a towing bicycle and a towed wheelchair of claim 1 in which said tensioning means are turnbuckles.

* * * * *